United States Patent
Berger et al.

(10) Patent No.: US 7,153,234 B2
(45) Date of Patent: Dec. 26, 2006

(54) TWIN-CLUTCH GEARBOX AND METHOD FOR CONTROLLING AT LEAST TWO CLUTCHES IN A TWIN-CLUTCH GEARBOX OF A MOTOR VEHICLE

(75) Inventors: Reinhard Berger, Bühl (DE); Alexander Wuhrer, Bühl (DE)

(73) Assignee: LuK Lamellen und Kupplungsbau Beteiligungs KG, Buhl (DE)

( * ) Notice: Subject to any disclaimer, the term of this patent is extended or adjusted under 35 U.S.C. 154(b) by 172 days.

(21) Appl. No.: 10/711,247

(22) Filed: Sep. 3, 2004

(65) Prior Publication Data

US 2005/0258014 A1    Nov. 24, 2005

Related U.S. Application Data

(63) Continuation of application No. PCT/DE03/00646, filed on Feb. 28, 2003.

(30) Foreign Application Priority Data

Mar. 7, 2002    (DE)    ................................ 102 09 917

(51) Int. Cl.
*B60W 10/02*    (2006.01)

(52) U.S. Cl. ........................................................ 477/86
(58) Field of Classification Search .................. 477/86, 477/906, 907; 74/330, 331
See application file for complete search history.

(56) References Cited

U.S. PATENT DOCUMENTS 5,622,080 A * 4/1997 Furukawa .................... 74/335
6,055,879 A * 5/2000 Abe et al. .................... 74/335

FOREIGN PATENT DOCUMENTS

| DE | 19936886 | 3/2001 |
| JP | 58146749 | 9/1983 |
| JP | 59097349 | 6/1984 |

* cited by examiner

*Primary Examiner*—Dirk Wright
(74) *Attorney, Agent, or Firm*—Simpson & Simpson, PLLC

(57) ABSTRACT

A method for controlling at least two clutches in a twin-clutch gearbox of a motor vehicle, wherein at least one clutch is opened by at least one emergency valve. A twin-clutch gearbox of a motor vehicle, consisting of at least two clutches actuated by at least one clutch actuator by means of a release system, especially for carrying out said method, whereby an emergency valve is provided in order to open at least one clutch.

17 Claims, 2 Drawing Sheets

TWIN-CLUTCH GEARBOX AND METHOD FOR CONTROLLING AT LEAST TWO CLUTCHES IN A TWIN-CLUTCH GEARBOX OF A MOTOR VEHICLE

CROSS-REFERENCE TO RELATED APPLICATIONS

This application is filed under 35 U.S.C. §120 and §365(c) as a continuation of International Patent Application PCT/DE03/00646, filed Feb. 28, 2003, which application is incorporated herein by reference. This application also claims priority of German Patent Application No. 102 09 917.0, filed Mar. 7, 2002, which application is incorporated herein by reference.

BACKGROUND OF THE INVENTION

The present invention relates to a twin-clutch transmission and a method for controlling at least two clutches in a twin clutch transmission of a vehicle.

Twin-clutch transmissions, especially parallel shift transmissions, and methods for controlling the clutches of these transmission systems are known from vehicle technology. In the known twin-clutch transmissions, at least one clutch is engaged after the transmission controller of the vehicle is switched off. Also in the event of emergency operation or a system fault, such as a failure of the transmission controller, the clutch remains in the engaged condition. This has the particular disadvantage that the vehicle thereafter cannot be moved, such as for towing, without additional measures.

OBJECT OF THE INVENTION

Accordingly, the object of the present invention is to provide a twin-clutch transmission and a method for controlling at least two clutches in a twin-clutch transmission of a vehicle that realizes a possibility for emergency disengagement of the clutches.

This objective is achieved in terms of method by a method for controlling at least two clutches in a twin-clutch transmission of a vehicle in which at least one clutch is disengaged via at least one emergency valve.

Using the method of the present invention, there is a possibility of disengaging one or preferably a plurality of clutches in a twin-clutch transmission or a parallel transmission as needed. For example, after shutting off the transmission controller or after parking the vehicle or the like, a general disengagement of the clutches may be realized using the method of the invention.

According to a further development, an emergency valve may preferably be connected to a hydrostatic release system of each clutch in an electromotive clutch actuating mechanism. By opening the emergency valve or by opening a plurality of emergency valves if, for example, an emergency valve is provided for each clutch, the fluid from the pressure chamber of the hydrostatic release system, for example, can escape into an unpressurized chamber, such as a reservoir or the like, so that the clutches may then be disengaged without being subject to force.

It is also conceivable that at least one emergency valve connected to the ignition is wired in parallel with the transmission controller, the emergency valve being actively closed when the ignition is switched on and opened when the ignition is switched off. In this way using the method of the invention, a general disengagement of the clutches can be realized in the twin-clutch transmission or parallel shift transmission.

Within the context of an advantageous embodiment, it may be provided in the method of the invention that at least one of the clutches is opened via at least one emergency valve when a system fault is detected. Therefore, an emergency opening of preferably both clutches of the twin-clutch transmission is realized in response to the occurrence of a system fault.

Any predetermined fault to be defined can be used as a system fault. Preferably, when there is a failure of a clutch actuator and/or when there is a failure of the processor of a transmission controller and/or when the transmission controller switches off and/or when there is a failure of the power supply of the transmission controller, a system error may be detected.

A further development of the invention may provide that at least one emergency valve connected, for example, in series with the transmission controller is used that is actively closed when the transmission controller is operating normally and is automatically opened when there is a defined system fault.

It is especially advantageous if, for example, each emergency valve is at least mechanically controllable or the like, so that a manual emergency disengagement of each clutch is possible in order to be able, for example, to tow the vehicle. It is conceivable that an exclusively mechanical actuation or also an additional electrical drive of each emergency valve is provided.

The method of the invention may be modified accordingly through the design type as well as the type of actuation or drive of each emergency valve. For example, at the beginning of the method a check can be made of whether the transmission controller or the like is activated. When the transmission controller is activated, a check may then be made of whether a system fault is detected or recognized. If this is the case, the emergency valves of both clutches are opened, or, if no system fault is recognized, they are closed. In this way an emergency opening is carried out as in response to the detection of a system fault.

The method proposed by the invention may advantageously be used in particular in parallel shift transmissions because there, unlike in a so-called add-on automated shift transmissions, the vehicle is not secured by a parking brake against rolling away, and therefore a disengagement of the clutch in this situation is not critical to safety. It is also possible that the proposed method is used in an electronic clutch management system.

Moreover, the objective of the invention may be achieved in terms of the device via a twin-clutch transmission of a vehicle having at least two clutches that are actuated at least via a release system of at least one clutch actuator, especially to carry out the proposed method, at least one emergency valve being provided to disengage at least one clutch.

SUMMARY OF THE INVENTION

Accordingly, a twin-clutch transmission or the like is described in which preferably both clutches may be disengaged as needed in order to be able to move the vehicle without additional measures even after the transmission controller is switched off.

A further development of the invention may provide that, in the use of an electromotive clutch actuating mechanism or the like, an emergency valve is connected to a hydrostatic disengagement system of each clutch so that when opening the emergency valve, the clutch assigned to each is not subject to force and therefore is disengaged.

The use of an emergency valve that is open in the currentless state is especially advantageous. This means that current is applied to the emergency valve when it is in the normal operating state, and therefore the valve is closed. If the transmission controller is switched off, the emergency valve that is connected, for example, to the transmission controller may be automatically opened.

Within the context of another embodiment of the invention, the emergency valve connected to the ignition or to the ignition lock may also be connected, for example, in parallel to the transmission controller so that the emergency valve is actively closed when the ignition is switched on and automatically closed when the ignition is switched off.

It is also possible that, in the twin-clutch transmission of the invention, other optional connections between the transmission controller and the particular emergency valve are realized.

Another variant of the invention may provide that the emergency valve is electrically connected to the transmission controller in such a manner that the emergency valve is actively closed in the normal operation of the transmission control device and upon detection of a fault is automatically opened. In this way, with the transmission system of the invention, an emergency disengagement of the provided clutches in response to a detected system fault may be realized.

According to the invention, the twin-clutch transmission may have at least one mechanically operated emergency valve to manually disengage the clutch in order to facilitate, for example, the towing of a defective vehicle. It is also possible that each emergency valve has an electrical operation either in addition to or instead of the mechanical one.

According to a further development of the invention, the transmission system of the invention may preferably have a friction twin-clutch with compressed clutches that are not subject to force when disengaged, each of which is operated with an electromotive clutch actuator via a hydrostatic release system. It is also conceivable that another actuation system is used for the clutches.

BRIEF DESCRIPTION OF THE DRAWINGS

Additional advantages and advantageous embodiments arise from the dependent claims and the drawings described below. In the drawing:

DETAILED DESCRIPTION OF THE INVENTION

Figure 1:
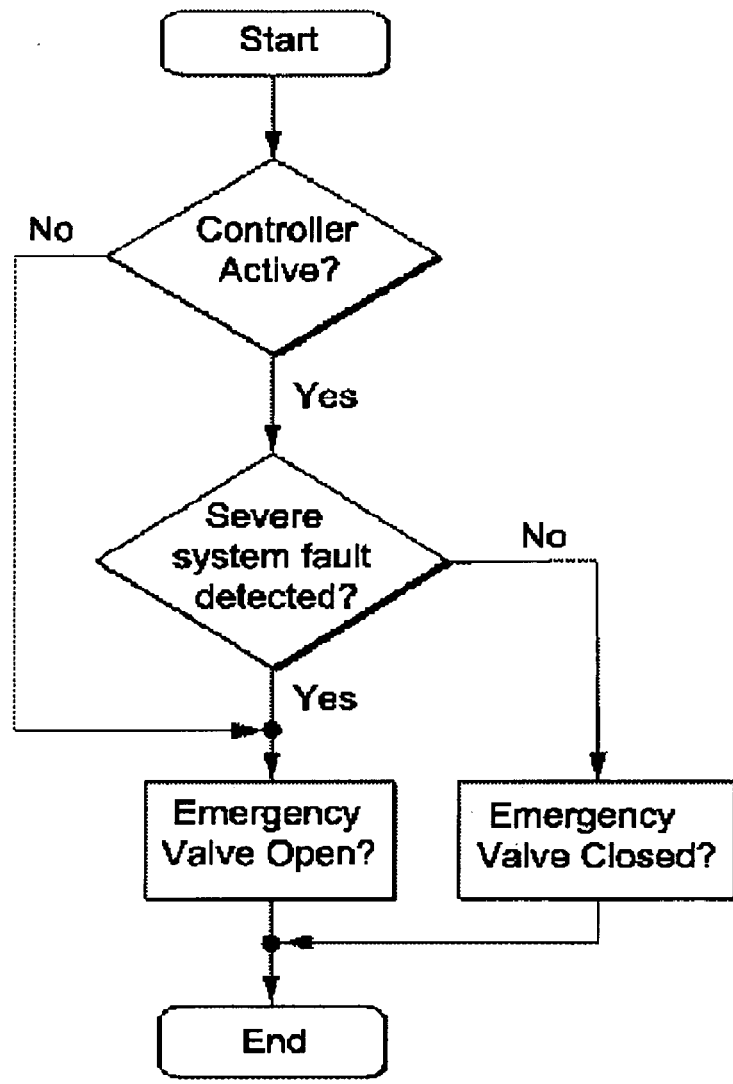
FIG. 1 is a flow diagram of a possible exemplary embodiment according to the method of the invention.

Illustrated in FIG. 1 is a flow diagram of one possible exemplary embodiment of the method according to the invention.

At the beginning of the proposed method, a check is made of whether transmission controller 112 is activated. When transmission controller 112 is activated, a check may then be made of whether a system fault has been detected or recognized. If this is the case, emergency valves 109, 110 of both clutches 101, 102 may be opened. Should no system fault have been recognized, emergency valves 109, 110 remain or become closed. Thereafter, the method is terminated. Therefore, in this variant of the method according to the invention, an emergency opening is carried out in response to the detection of a system fault.

Another variant of the invention, which is likewise indicated in FIG. 1, provides that, emergency valves 109, 110 are opened when transmission controller 112 is not activated or switched off. This means that clutches 101, 102 are disengaged independent of system faults.

Figure 2:
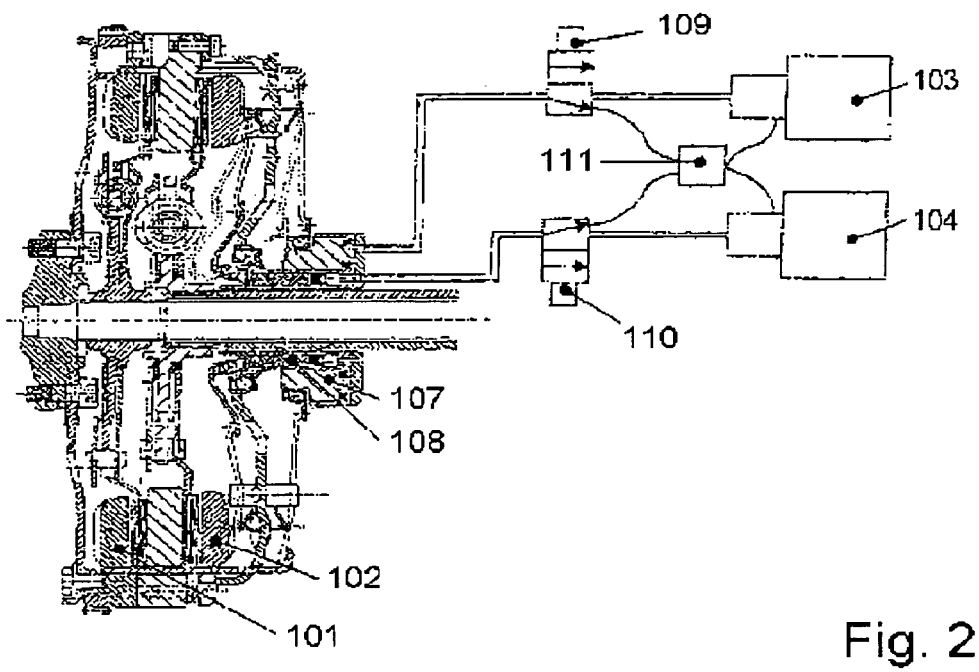
FIG. 2 is a diagrammatic partial view of a twin-clutch transmission according to the invention.

Illustrated in FIG. 2 is a schematic partial view of a twin-clutch transmission of the invention. The automated twin-clutch system comprises in particular a dry twin-clutch that includes two compressed clutches 101, 102 that are not subject to force. Clutches 101, 102 are each operated using an electromotive clutch actuator 103, 104, each of which acts via a hydrostatic release system 105, 106 on a clutch release bearing 107, 108 to actuate each particular clutch 101, 102.

According to the invention, each hydrostatic release system 105, 106 has an emergency valve 109, 110. By opening the two emergency valves 109, 110, the fluid in each case may escape from the pressure chamber of the hydrostatic release system 105, 106 into an unpressurized reservoir 111, so that clutches 101, 102 may be disengaged without being subject to force.

Figure 4:
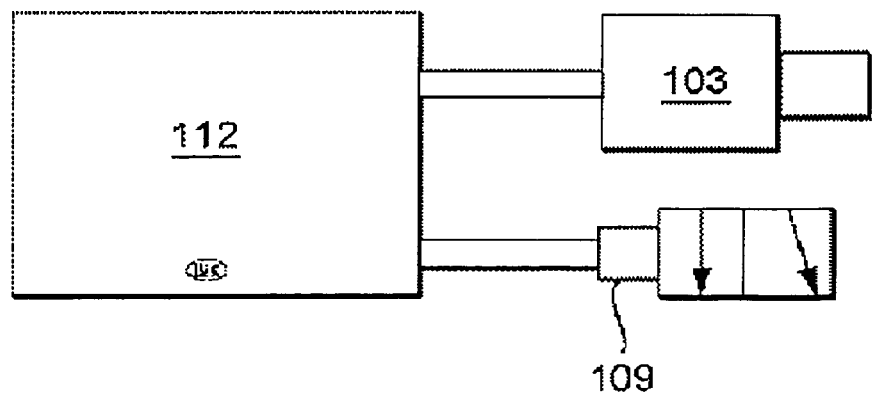
Figure 3:
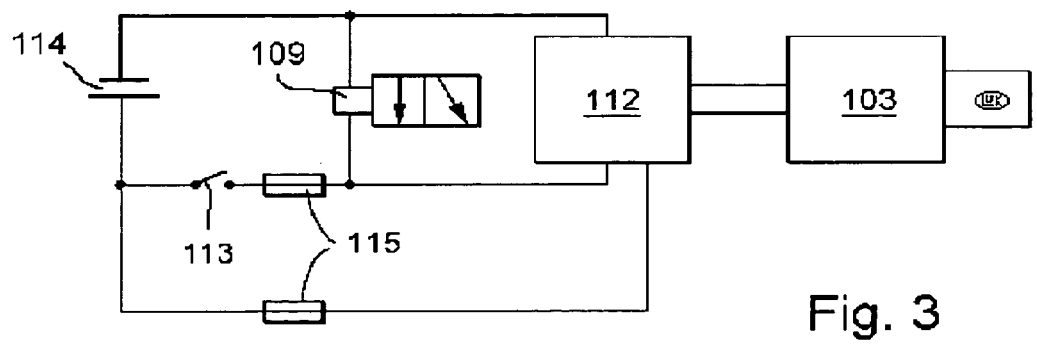
FIG. 3 shows a first embodiment of the system of an emergency valve in the twin-clutch transmission according to the invention; and, FIG. 4 shows a second embodiment of the system of an emergency valve in the twin-clutch transmission according to the invention.

Illustrated in FIGS. 3 and 4 are a first and a second exemplary embodiment of the disposition of emergency valves 109, 110 in the twin-clutch transmission, each showing only one emergency valve 109.

In FIG. 3, emergency valve 109 is disposed parallel to the transmission controller 112, emergency valve 109 being electrically connected with ignition or ignition lock 113 in such a manner that emergency valve 109 is actively closed when ignition 113 is switched on and opened when ignition 113 is switched off.

In FIG. 4, emergency valve 109 is connected in series with transmission controller 112. In this second exemplary embodiment, emergency valve 109 is driven via transmission controller 112. In this context, emergency valve 109 is actively closed in the operation of transmission controller 112, and when transmission controller 112 is switched off or when the power supply of transmission controller 112 fails, it is automatically opened as a matter of principle. Moreover, in FIG. 4, the battery of the vehicle is labeled 114 and the fuses are labeled 115.

The aforementioned variants, regarding the disposition and actuation of emergency valves 109, 110 may also optionally still be modified and/or combined with each other.

The patent claims submitted with the application are proposed formulations without prejudice to the achievement of further patent protection. The applicant reserves the right to submit claims for further combinations of features previously only disclosed in the description and/or the drawings.

References used in dependent claims refer to the further development of the subject matter of the principle claim via the features of the particular dependent claim; they are not to be understood as a renunciation of achieving independent protection for the combination of features for the dependent claims that are referenced.

Since the subject matter of the dependent claims may constitute separate and independent inventions in relation to the state of the art on the priority date, the applicant reserves the right to make them the subject matter of independent claims or division declarations. Furthermore, they may also contain independent inventions that have a design that is independent of the subject matter of the preceding dependant claims.

The embodiments are not to be understood as a restriction of the invention. Rather, numerous amendments and modifications are possible within the context of the current disclosure, especially those variants, elements and combinations and/or materials that one skilled in the art may learn, for example, by combining individual ones together with those in the general description and embodiments in addition to features and/or elements or methodological steps described in the claims and contained in the drawings with the aim of achieving the objective and leading to a new subject matter or new methodological steps or sequences of steps via combinable features, even as far as production, testing and work procedures are concerned.

What is claimed is:

1. A method for controlling at least two clutches in a twin-clutch transmission of a vehicle, which comprises the steps of disengaging at least one clutch via at least one emergency valve and opening said at least one clutch without subjecting said at least one clutch to force, said at least one emergency valve connected to a hydrostatic release system in a respective electromotive clutch actuating mechanism for said at least one clutch.

2. The method as described in claim 1, wherein at least one emergency valve is connected to an ignition lock wired in parallel to a transmission controller, comprising the steps of actively closing the at least one emergency valve when the ignition lock is switched on and opening said emergency valve when the ignition lock is switched off.

3. The method as described in claim 1, comprising the step of disengaging at least one of the clutches via at least one emergency valve when there is a detection of a system fault.

4. The method as described in claim 3, comprising the step of detecting a system fault when there is a failure of clutch actuators and/or when there is a failure of a processor of a transmission controller and/or when a stall protection for a motor is activated and/or when the transmission controller is switched off and/or when there is a failure of a power supply for the transmission controller.

5. The method as described in claim 3, comprising the step of actively closing at least one emergency valve connected to a third transmission controller during normal operation of the transmission controller and automatically opening when a system fault is detected.

6. The method as described in claim 5, comprising the step of mechanically actuating each emergency valve so that a manual disengagement of each clutch is made possible.

7. The method as described in claim 6, comprising the step of electrically actuating each emergency valve so that a manual disengagement of each clutch is made possible.

8. The method as described in claim 7, comprising the step of determining whether the transmission controller is activated, when the transmission controller is activated, whether there is a system fault, and if a system fault is present whether the emergency valves of both clutches are open.

9. The method as described in claim 8, comprising the step of disengaging the emergency valves of the two clutches independent of the detection of a system fault when the transmission controller is switched off.

10. The method as described in claim 8, comprising the step of closing the emergency valves of the two clutches when the transmission controller is activated and when no system fault is present.

11. A twin-clutch transmission for a vehicle comprising at least two clutches, a hydrostatic release system for each clutch, said release system comprising at least one electromotive clutch actuating mechanism, said twin clutch transmission further comprising an emergency valve connected to said hydrostatic release system for each clutch, so that when the emergency valve is opened the clutch assigned to each is disengaged without being subject to force.

12. The twin-clutch transmission as described in claim 11, wherein the emergency valve is opened when the power supply thereto is interrupted.

13. The twin-clutch transmission as described in claim 11, wherein the emergency valve is electrically connected to the ignition in such a manner that the emergency valve is actively closed when the ignition lock is switched on and opened when the ignition lock is switched off.

14. The twin-clutch transmission as described in claim 11, wherein the emergency valve is electrically connected to the transmission controller in such a manner that the emergency valve is actively closed during the operation of the transmission controller and is automatically opened when a system fault is detected.

15. The twin-clutch transmission as described in claim 11, wherein at least one mechanically actuated emergency valve is provided for manual disengagement of the clutch.

16. The twin-clutch transmission as described in claim 11, wherein at least one electrically actuated emergency valve is provided for manual disengagement of the clutch.

17. The twin-clutch transmission as described in claim 11, wherein a dry twin-clutch is provided with compressed clutches that are disengaged in a manner not subjected to force.

* * * * *